(12) United States Patent
Ozeki et al.

(10) Patent No.: US 9,093,218 B2
(45) Date of Patent: Jul. 28, 2015

(54) PERMANENT MAGNET FOR MOTOR, AND METHOD FOR MANUFACTURING THE PERMANENT MAGNET FOR MOTOR

(75) Inventors: Izumi Ozeki, Osaka (JP); Katsuya Kume, Osaka (JP); Junichi Nakayama, Osaka (JP); Yuuki Fukuda, Osaka (JP); Toshinobu Hoshino, Osaka (JP); Tomokazu Horio, Osaka (JP); Kenji Nakamura, Toyota (JP)

(73) Assignees: NITTO DENKO CORPORATION, Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 829 days.

(21) Appl. No.: 12/922,861
(22) PCT Filed: Mar. 17, 2009
(86) PCT No.: PCT/JP2009/055192
§ 371 (c)(1),
(2), (4) Date: Sep. 16, 2010
(87) PCT Pub. No.: WO2009/116540
PCT Pub. Date: Sep. 24, 2009

(65) Prior Publication Data
US 2011/0012460 A1 Jan. 20, 2011

(30) Foreign Application Priority Data
Mar. 18, 2008 (JP) ................. 2008-069403

(51) Int. Cl.
H01F 41/02 (2006.01)
H01F 1/04 (2006.01)
(Continued)

(52) U.S. Cl.
CPC .......... *H01F 41/0293* (2013.01); *H01F 1/0577* (2013.01); *H01F 10/126* (2013.01);
(Continued)

(58) Field of Classification Search
CPC ... H01F 1/0551; H01F 1/0577; H01F 10/126; H01F 41/0266; H01F 41/0293; H01F 3/10; H01F 27/2804; C04B 35/2641
USPC .............. 29/607, 609, 598; 252/62.51, 62.59, 252/62.6, 62.62, 62.63, 62.55; 148/101, 148/103, 108, 121, 301
See application file for complete search history.

(56) References Cited

U.S. PATENT DOCUMENTS 4,069,073 A * 1/1978 Tadokoro et al.
5,538,657 A * 7/1996 Ogata et al. ................ 252/62.63
(Continued)

FOREIGN PATENT DOCUMENTS

CN 101013621 A 8/2007
CN 101136275 A 3/2008
(Continued)

OTHER PUBLICATIONS

Machine Language Translation (English) of Japanese Patent Publication JP 2000-324736, Mar. 2014.*
(Continued)

*Primary Examiner* — A. Dexter Tugbang
(74) *Attorney, Agent, or Firm* — Sughrue Mion, PLLC

(57) ABSTRACT

A method for producing a permanent magnet for a motor, including a step of producing a slurry of a magnet powder, a step of molding the slurry into a sheet form to prepare green sheets of the magnet powder, and a step of alternately laminating the green sheets of the magnet powder and an insulating layer and sintering the laminated plural layers.

5 Claims, 7 Drawing Sheets

(51) Int. Cl.
*H01F 10/12* (2006.01)
*H02K 1/27* (2006.01)
*H02K 15/03* (2006.01)
*H01F 1/057* (2006.01)

(52) U.S. Cl.
CPC .......... *H01F41/0266* (2013.01); *H02K 1/2766* (2013.01); *H02K 15/03* (2013.01); *H01F 1/0572* (2013.01); *Y10T 29/49009* (2015.01)

(56) References Cited

U.S. PATENT DOCUMENTS

| | | | | |
|---|---|---|---|---|
| 5,761,791 | A | * | 6/1998 | Bando .............................. 29/609 |
| 5,958,284 | A | * | 9/1999 | Takami et al. ............. 252/62.63 |
| 6,337,123 | B1 | | 1/2002 | Ryugo et al. |
| 2002/0054824 | A1 | | 5/2002 | Tokoro et al. |
| 2004/0078960 | A1 | * | 4/2004 | Roshen .......................... 29/609 |
| 2005/0081961 | A1 | * | 4/2005 | Yamashita ................... 148/301 |
| 2006/0214855 | A1 | | 9/2006 | Harada et al. |
| 2007/0151632 | A1 | | 7/2007 | Komuro et al. |
| 2008/0054738 | A1 | | 3/2008 | Komuro et al. |
| 2011/0012700 | A1 | | 1/2011 | Ozeki et al. |

FOREIGN PATENT DOCUMENTS

| | | | | |
|---|---|---|---|---|
| JP | 06096973 | A | * 4/1994 | ...................... 29/607 |
| JP | 8-8111 | A | 1/1996 | |
| JP | 8-222912 | A | 8/1996 | |
| JP | 11-186815 | A | 7/1999 | |
| JP | 2000-025189 | A | 1/2000 | |
| JP | 2000-324736 | A | 11/2000 | |
| JP | 2001-25189 | A | 1/2001 | |
| JP | 2001-119143 | A | 4/2001 | |
| JP | 2002-164239 | A | 6/2002 | |
| JP | 2005-228830 | A | 8/2005 | |
| JP | 2006-179830 | A | 7/2006 | |
| JP | 2006-304271 | A | 11/2006 | |
| JP | 2007-305818 | A | 11/2007 | |
| JP | 2007-306735 | A | 11/2007 | |
| JP | 4872109 | B2 | 12/2011 | |

OTHER PUBLICATIONS

Machine Language Translation (English) of Japanese Patent Publication JP 2001-25189, Mar. 2014.*
Office Action, dated Mar. 5, 2013, issued by the State Intellectual Property Office of the People's Republic of China in counterpart Chinese Application No. 200980109638.6.
Office Action, dated Feb. 26, 2013, issued by the Japanese Patent Office in counterpart Japanese Application No. 2011-256311.
Office Action dated Apr. 2, 2013 issued by the Japanese Patent Office in counterpart Japanese Patent Application No. 2008-069403.
Extended European Search Report dated May 6, 2011, in Application No. 09721837.4.
Notification of Reasons for Refusal dated Oct. 4, 2011 from the Japanese Patent Office in counterpart Japanese application No. 2008-069403.
Office Action issued Jul. 3, 2012 by the State Intellectual Property Office of the People's Republic of China in counterpart Chinese Application No. 200980109638.6.
Office Action issued May 11, 2012 by the Japanese Patent Office in counterpart Japanese Application No. 2008-069403.
International Search Report for PCT/JP2009/055192 dated Jun. 9, 2009, 5 pages [PCT/ISA/210].
Written Opinion for PCT/JP2009/055192 dated Jun. 9, 2009, 4 pages, [PCT/ISA/237].
Office Action dated Sep. 3, 2013, issued by the Patent Office of the P.R.C. in corresponding Chinese Application No. 200980109638.6.
Notice of Preliminary Rejection dated Jul. 4, 2014 issued by the Korean Intellectual Property Office in counterpart Korean Patent Application No. 10-2010-7020903.
Notification of Reexamination, Issued by the State Intellectual Property Office of P.R. China, Dated Oct. 22, 2014, in counterpart Chinese Application No. 200980109638.6.
Office Action dated Jan. 27, 2015, issued by the Korean Intellectual Property Office in counterpart Korean Application No. 10-2010-7020903.
Decision of Reexamination dated Mar. 27, 2015, issued by the State Intellectual Property Office of P.R. China in counterpart Chinese Application No. 200980109638.6.

* cited by examiner

PERMANENT MAGNET FOR MOTOR, AND METHOD FOR MANUFACTURING THE PERMANENT MAGNET FOR MOTOR

TECHNICAL FIELD

The present invention relates to a permanent magnet for a motor, to be buried in a permanent magnet motor, and relates to a method for producing a permanent magnet for a motor.

BACKGROUND ART

In recent years, a reduction in size and weight, an increase in power and an increase in efficiency have been required for permanent magnet motors used in hybrid vehicles, hard disk drives or the like. Such a permanent magnet motor has a configuration in which permanent magnets are buried in the outer periphery of a rotor and coils are arranged in the inner periphery of a stator, for example, as shown in Patent Document 1 (JP-A 2007-306735).

In realizing the reduction in size and weight, the increase in power and the increase in efficiency of the permanent magnet motor, further improvement of the magnetic characteristics is required for the permanent magnets to be buried in the permanent magnet motor. The permanent magnet includes ferrite magnets, Sm—Co-based magnets, Nd—Fe—B-based magnets, $Sm_2Fe_{17}N_x$-based magnets, etc.; and in particular, Nd—Fe—B-based magnets having high coercive force are used as the permanent magnets for permanent magnet motors.

Here, as a method for producing permanent magnets for use in permanent magnet motors, a powder sintering method is generally used. In the powder sintering method for use herein, a raw material is first pulverized with a jet mill (dry pulverization) to produce a magnet powder as shown in FIG. 9. Thereafter the magnet powder is placed in a mold, and press-molded to a desired shape while applying thereto a magnetic field from the outside. Then, the solid magnet powder thus molded to the desired shape is sintered at a predetermined temperature (for example, 1100° C. in the case of the Nd—Fe—B-based magnet), thereby producing the permanent magnet.

Recently, the demand for reducing the size and the weight of a permanent magnet motor is increasing; and in case where a permanent magnet motor is down-sized and in order to make the down-sized permanent magnet motor keep the same torque as before, the rotor must be rotated at a high speed. In high-speed rotation, eddy current is generated in the permanent magnets buried in the motor. When permanent magnets integrally molded according to the above-mentioned powder sintering method are used in such a permanent magnet motor, the eddy current shall be generated throughout all the permanent magnets.

When the eddy current is generated in the permanent magnets, the temperature of the permanent magnets rises. With the increase in the temperature thereof, the coercive force of permanent magnets lowers, and therefore the motor torque also lowers.

Patent Document 2 (JP-A 2001-25189) describes a permanent magnet as integrally so formed that a highly-insulating ferrite magnet is arranged between plural Nd magnets. Even when eddy current has occurred in the permanent magnet having the constitution, the eddy current could stay inside the individual Nd magnets as divided by the ferrite magnet, and therefore the eddy current may be reduced.

Patent Document 1: JP-A 2007-306735 (Pages 4 to 6, FIG. 1)

Patent Document 2: JP-A 2001-25189 (Pages 3 to 4, FIG. 2)

DISCLOSURE OF THE INVENTION

For the permanent magnet described in Patent Document 2, the powder sintering method shown in FIG. 9 is still used, though there is a difference between them in that two types of magnet powders of an Nd magnet powder and a ferrite magnet powder are used for the permanent magnet. Producing a permanent magnet according to the powder sintering method involves the following problems. That is to say, in the powder sintering method, it is necessary to secure a predetermined porosity in a press-molded magnet powder in order to perform magnetic field orientation. And when the magnet powder having the predetermined porosity is sintered, it is difficult to uniformly perform contraction which occurs at the time of sintering, and deformations such as warpage and depressions occur after sintering. Further, since pressure unevenness occurs at the time of pressing the magnet powder, sparse and dense of the magnet after sintering are formed to generate strain on a surface of the magnet. Conventionally, it has therefore been required to compression-mold the magnet powder to a larger size than that of a desired shape, previously assuming that strain is generated on the surface of the magnet. Then, cutting and polishing operations using a diamond have been performed after sintering to perform processing for correcting to the desired shape. As a result, production steps increase, and there is a possibility of deteriorating qualities of the permanent magnet produced.

The present invention has been made for the purpose of solving the above-mentioned conventional problems, and an object is to provide a permanent magnet for motor, in which the contraction due to sintering becomes uniform and the deformations such as warpage and depressions hardly occur after sintering, and to provide a method for producing such a permanent magnet for motor. Even when the permanent magnet motor with the permanent magnets buried therein is rotated at a high speed, the eddy current to occur inside the permanent magnets may be reduced, and therefore the permanent magnets therein are free from the problems of temperature elevation and coercive force depression. The permanent magnet has made it possible to provide a high-torque small-sized motor.

Namely, the present invention relates to the following items (1) to (13).

(1) A permanent magnet for a motor, to be buried in a permanent magnet motor, including:
a plurality of sheet magnets for lamination, and
an insulating layer arranged between the plurality of sheet magnets for lamination,
in which the sheet magnets include Nd-based magnet, and a layer of a Dy compound or a layer of a Tb compound is formed on a surface of an Nd magnet particle constituting the sheet magnets.

(2) The permanent magnet for a motor according to (1), in which the insulating layer is formed of a ceramic green sheet to be sintered along with the sheet magnets.

(3) The permanent magnet for a motor according to (1) or (2), in which the insulating layer is formed of a resin to bond the plurality of sheet magnets sintered.

(4) A method for producing a permanent magnet for a motor, to be buried in a permanent magnet motor, including:
a step of producing a slurry of a magnet powder,
a step of molding the slurry into a sheet form to prepare green sheets of the magnet powder, and a step of alternately laminating the green sheets of the magnet powder and an insulating layer and sintering the laminated plural layers.

(5) A method for producing a permanent magnet for a motor, to be buried in a permanent magnet motor, including:
a step of producing a slurry of a magnet powder,
a step of molding the slurry into a sheet form to prepare a green sheet of the magnet powder,
a step of sintering the green sheet of the magnet powder to produce sheet magnets, and
a step of alternately laminating a plurality of the sheet magnets and an insulating layer.

(6) The method for producing a permanent magnet for a motor according to (4) or (5), in which the magnet powder includes an Nd-based magnet powder.

(7) The method for producing a permanent magnet for a motor according to (5), in which the insulating layer is formed of a ceramic green sheet.

(8) The method for producing a permanent magnet for a motor according to (6), in which the insulating layer is formed of a resin to bond the sheet magnets.

(9) A permanent magnet for a motor, to be buried in a permanent magnet motor, as produced according to a production method for a permanent magnet for a motor, the method including:
a step of producing a slurry of a magnet powder,
a step of molding the slurry into a sheet form to prepare green sheets of the magnet powder, and
a step of alternately laminating the green sheets of the magnet powder and an insulating layer and sintering the laminated plural layers.

(10) A permanent magnet for a motor, to be buried in a permanent magnet motor, as produced according to a production method for a permanent magnet for a motor, the method including:
a step of producing a slurry of a magnet powder,
a step of molding the slurry into a sheet form to prepare a green sheet of the magnet powder,
a step of sintering the green sheet of the magnet powder to produce sheet magnets, and
a step of alternately laminating a plurality of the sheet magnets and an insulating layer.

(11) The permanent magnet for a motor according to (9) or (10), in which the magnet powder includes an Nd-based magnet powder.

(12) The permanent magnet for a motor according to (9), in which the insulating layer is formed of a ceramic green sheet.

(13) The permanent magnet for a motor according to (10), in which the insulating layer is formed of a resin to bond the sheet magnets.

According to the permanent magnet for a motor, having the constitution of the above (1), the permanent magnet for a motor is constituted by laminating a plurality of sheet magnets with insulating layers arranged between them. Therefore, when a permanent magnet motor with the permanent magnets buried therein is rotated at a high speed, the eddy current to occur inside the permanent magnets may be reduced. Accordingly, the permanent magnets are free from the problems of temperature elevation and coercive force depression, therefore making it possible to provide a high-power small-sized motor.

Since a plurality of sheet magnets are laminated to constitute the permanent magnet, the contraction thereof due to sintering is reduced, whereby the deformations such as warpage and depressions hardly occur after sintering. Further, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

According to the permanent magnet for a motor of the above (1), for an Nd-based magnet capable of especially securing a high coercive force, even when the permanent magnet motor is rotated at a high speed, the eddy current to occur inside the magnet can be reduced. Accordingly, the permanent magnet makes it possible to provide a small-sized and high-power motor.

According to the permanent magnet for a motor of the above (2), the ceramic green sheets to be the insulating layers are sintered together in sintering the green sheets of magnet powder, whereby a permanent magnet in which a plurality of sheet magnets are laminated is formed. Therefore, after sintered, it is not necessary to bond the sheet magnets with the insulating layers therebetween, and therefore, a permanent magnet in which a plurality of sheet magnets are laminated can be produced in a simplified steps.

According to the permanent magnet for a motor of the above (3), the respective sheet magnets are, after molded, bonded with the resin to be the insulating layer. Therefore, permanent magnets produced under conventional sintering conditions may be bonded with a resin to obtain a simple-structured permanent magnet in which the eddy current to occur inside the magnets may be reduced.

According to the production method for a permanent magnet for a motor of the above (4), a permanent magnet for a motor is produced by producing a slurry of a magnet powder; molding the produced slurry into a sheet form to prepare green sheets of the magnet powder; and alternately laminating the green sheets of the magnet powder and an insulating layer and sintering the laminated plural layers. Therefore, after sintered, it is not necessary to bond the sheet magnets with the insulating layers therebetween, and therefore, a permanent magnet in which a plurality of sheet magnets are laminated can be produced in a simplified steps.

Additionally, even when the permanent magnet motor in which the thus-produced permanent magnets are buried therein is rotated at a high speed, the eddy current to occur inside the magnet can be reduced. Accordingly, the permanent magnets are free from the problems of temperature elevation and coercive force depression, therefore making it possible to provide a high-power small-sized motor.

Furthermore, the contraction due to sintering becomes uniform, whereby the deformations such as warpage and depressions do not occur after sintering. Additionally, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

According to the production method for a permanent magnet for a motor of the above (5), a permanent magnet for a motor is produced by producing a slurry of a magnet powder; molding the produced slurry into a sheet form to prepare a green sheet of the magnet powder; sintering the green sheet of the magnet powder to produce sheet magnets; and alternately laminating a plurality of the sheet magnets and an insulating layer. Therefore, permanent magnets produced under conventional sintering conditions may be bonded with a resin to obtain a simple-structured permanent magnet in which the eddy current to occur inside the magnets may be reduced.

Additionally, even when the permanent magnet motor in which the thus-produced permanent magnets are buried therein is rotated at a high speed, the eddy current to occur inside the magnet can be reduced. Accordingly, the permanent magnets are free from the problems of temperature elevation and coercive force depression, therefore making it possible to provide a high-power small-sized motor.

Furthermore, the contraction due to sintering becomes uniform, whereby the deformations such as warpage and depressions do not occur after sintering. Additionally, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

According to the production method for a permanent magnet for a motor of the above (6), regarding the production of an Nd-based magnet capable of especially securing a high coercive force, even when the permanent magnet motor is rotated at a high speed, it is possible to produce an Nd-based magnet in which the eddy current to occur inside the magnet can be reduced.

According to the production method for a permanent magnet for a motor of the above (7), the ceramic green sheets to be the insulating layers are sintered together in sintering the green sheets of magnet powder, whereby a permanent magnet in which a plurality of sheet magnets are laminated is formed. Therefore, after sintered, it is not necessary to bond the sheet magnets with the insulating layers therebetween, and therefore, a permanent magnet in which a plurality of sheet magnets are laminated can be produced in a simplified steps.

According to the production method for a permanent magnet for a motor of the above (8), the respective sheet magnets are, after formed, bonded with the resin to be the insulating layer. Therefore, it is possible to produce a permanent magnet in which a plurality of sheet magnets are laminated, by a simple production process using permanent magnets produced under conventional sintering conditions and a resin.

According to the permanent magnet for a motor of the above (9), even when the permanent magnet motor in which the permanent magnets are buried therein is rotated at a high speed, the eddy current to occur inside the magnet can be reduced. Accordingly, the permanent magnets are free from the problems of temperature elevation and coercive force depression, therefore making it possible to provide a high-power small-sized motor.

Furthermore, the contraction due to sintering becomes uniform, whereby the deformations such as warpage and depressions do not occur after sintering. Additionally, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

According to the permanent magnet for a motor of the above (10), even when the permanent magnet motor in which the permanent magnets are buried therein is rotated at a high speed, the eddy current to occur inside the magnet can be reduced. Accordingly, the permanent magnets are free from the problems of temperature elevation and coercive force depression, therefore making it possible to provide a high-power small-sized motor.

Furthermore, the contraction due to sintering becomes uniform, whereby the deformations such as warpage and depressions do not occur after sintering. Additionally, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

According to the permanent magnet for a motor of the above (11), for an Nd-based magnet capable of especially securing a high coercive force, even when the permanent magnet motor is rotated at a high speed, the eddy current to occur inside the magnet can be reduced. Accordingly, the permanent magnet makes it possible to provide a small-sized and high-power motor.

According to the permanent magnet for a motor of the above (12), the ceramic green sheets to be the insulating layers are sintered together in sintering the green sheets of magnet powder, whereby a permanent magnet in which a plurality of sheet magnets are laminated is formed. Therefore, after sintered, it is not necessary to bond the sheet magnets with the insulating layers therebetween, and therefore, a permanent magnet in which a plurality of sheet magnets are laminated can be produced in a simplified steps.

According to the permanent magnet for a motor of the above (13), the respective sheet magnets are, after molded, bonded with the resin to be the insulating layer. Therefore, permanent magnets produced under conventional sintering conditions may be bonded with a resin to obtain a simple-structured permanent magnet in which the eddy current to occur inside the magnets may be reduced.

DESCRIPTION OF REFERENCE NUMERALS AND SIGNS

1 Permanent Magnet
2 Permanent Magnet Motor
21 Sheet Magnet
22 Ceramic Insulating Layer
41 Slurry
42 Green Sheet

BEST MODE FOR CARRYING OUT THE INVENTION

A specific embodiment of a permanent magnet for motor and a method for producing a permanent magnet for motor according to the invention will be described below with reference to the drawings. First described is the constitution of a permanent magnet motor 2 with permanent magnets 1 of the present embodiment buried therein, with reference to FIG. 1.

Figure 1:
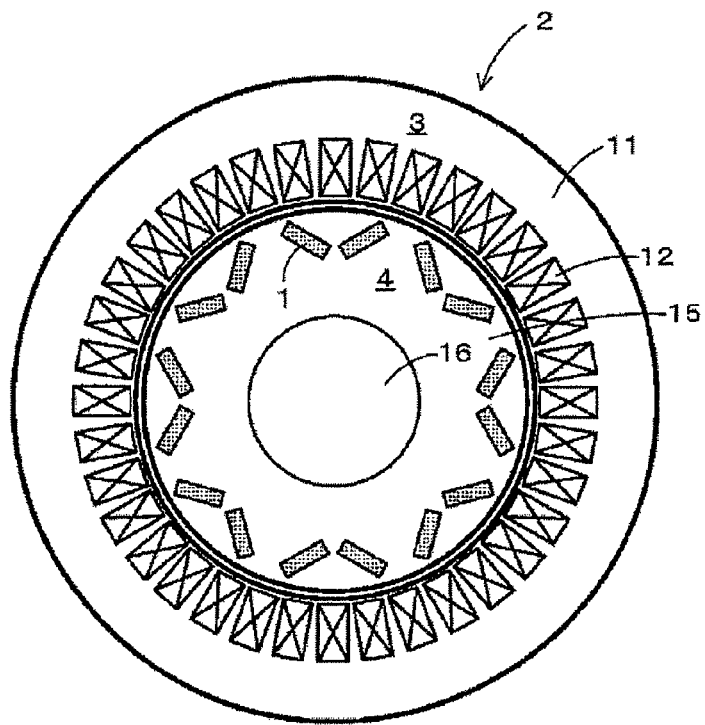
FIG. 1 is a view showing the internal constitution of a permanent magnet motor according to the present embodiment.

FIG. 1 is a view showing the internal constitution of a permanent magnet motor 2 according to the present embodiment.

As shown in FIG. 1, the permanent magnet motor 2 basically includes a stator 3 and a rotor 4 rotatably arranged inside the stator 3.

First described is the stator 3. The stator 3 includes a stator core 11 and a plurality of stator windings 12 wound around the stator core 11. A predetermined number of stator windings 12 are arranged on the inner peripheral surface of the stator 3 at regular intervals, and when the stator windings 12 are electrically charged, they generate a rotation magnetic field for rotating the rotor 4.

On the other hand, the rotor 4 is described. The rotor 4 includes a rotor body 15, a shaft 16 connected to the rotor body 15, and a plurality of permanent magnets 1 (in FIG. 1, 16) arranged nearly in V-shape inside the rotor body 15 and outside the shaft 16. The permanent magnets 1 are so arranged that their polarity alternately differs in the peripheral direction, and they generate suction power and repulsion power based on the rotary magnetic field generated by the stator windings 12. Based on the thus-generated suction power and repulsion power, the rotor 4 (that is, the shaft 16) rotates.

Constitution of Permanent Magnet

Next described is the constitution of the permanent magnet 1 to be buried in the permanent magnet motor 2, with reference to FIG. 2 to FIG. 7. A plurality of permanent magnets 1 to be buried in the permanent magnet motor 2 all have basically the same structure. Accordingly, of the plurality of permanent magnets 1 to be buried, one permanent magnet 1 alone is described as an example.

Figure 2:
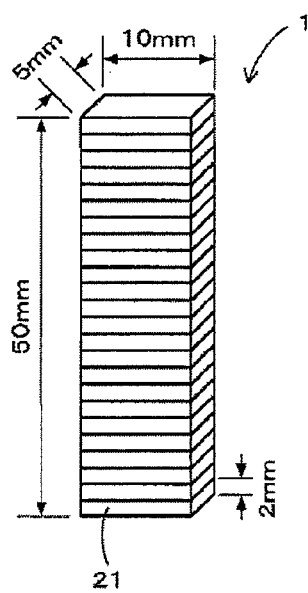
FIG. 2 is an overall view showing a permanent magnet according to the present embodiment.

The permanent magnet 1 of this embodiment is an Nd—Fe—B-based magnet. Dy (dysprosium) is added to the permanent magnet 1 for the purpose of increasing the coercive force of the magnet. Regarding the content of each constitutive ingredient, Nd is from 27 to 30 wt %, Dy (or Tb) is from 0.01 to 8 wt %, B is from 1 to 2 wt %, and Fe (electrolytic iron) is from 60 to 70 wt %. The permanent magnet 1 is formed by laminating a plurality of sheet magnets 21 as shown in FIG. 2. FIG. 2 is an overall view showing the permanent magnet 1 of this embodiment.

The sheet magnet 21 to constitute the permanent magnet 1 is described. The sheet magnet 21 is a sheet-like permanent magnet having a thickness of from 0.1 to 3 mm (in FIG. 2, 2 mm). As described hereinunder, this is produced by sintering a green sheet formed from a slurry of an Nd magnet powder. The permanent magnet 1 formed by laminating a plurality of sheet magnets 21 is a rectangular parallelepiped having a size of 10 mm×5 mm×50 mm.

Figure 3:
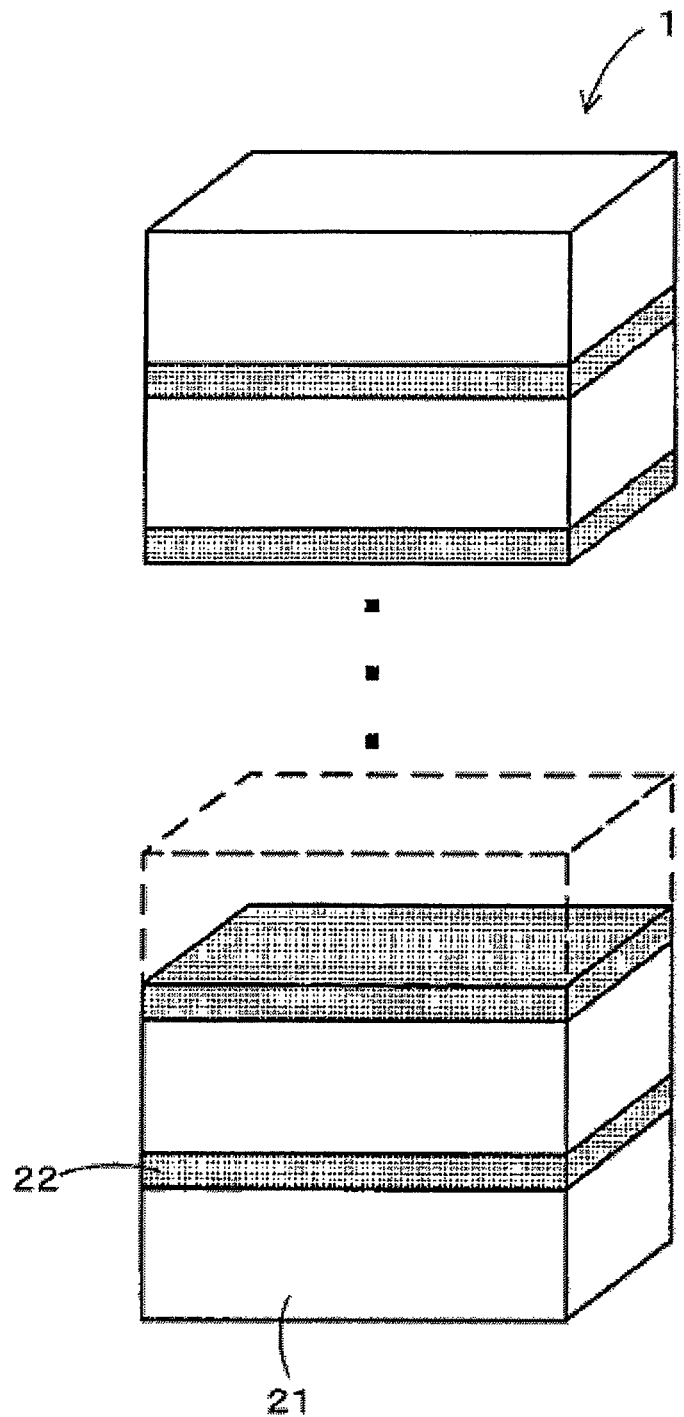
FIG. 3 is a schematic enlarged view showing a part of a permanent magnet according to the present embodiment.

Next, with reference to FIG. 3, the laminate configuration of the sheet magnets 21 constituting the permanent magnet 1 is described in more detail. FIG. 3 is a schematic enlarged view showing a part of the permanent magnet 1 of this embodiment.

As shown in FIG. 3, a ceramic insulating layer 22, which is an insulating layer produced by sintering a thin-film ceramic green sheet, is arranged between the respective sheet magnets 21 to be laminated in the permanent magnet 1. The ceramic insulating layer 22 is formed as follows. Before the green sheets of an Nd magnet powder are sintered, a ceramic green sheet is previously put between the magnet green sheets, the green sheets of magnet powder and the ceramic green sheets are thus alternately laminated, and these are sintered all together. Accordingly, after the sintering, the sheet magnets 21 and the ceramic insulating layers 22 are bonded to each other, and the permanent magnet 1 is thus integrally formed.

As the insulating layer, a heat-resistant adhesive resin such as an epoxy resin or the like may be used in place of the ceramic insulating layer 22. In case where an epoxy resin is used, the green sheets of an Nd magnet powder are first sintered to form a plurality of the sheet magnets 21, and then the epoxy resin is applied between the sheet magnets 21 and the sheet magnets 21 are thus bonded to each other to constitute the permanent magnet 21.

Figure 4:
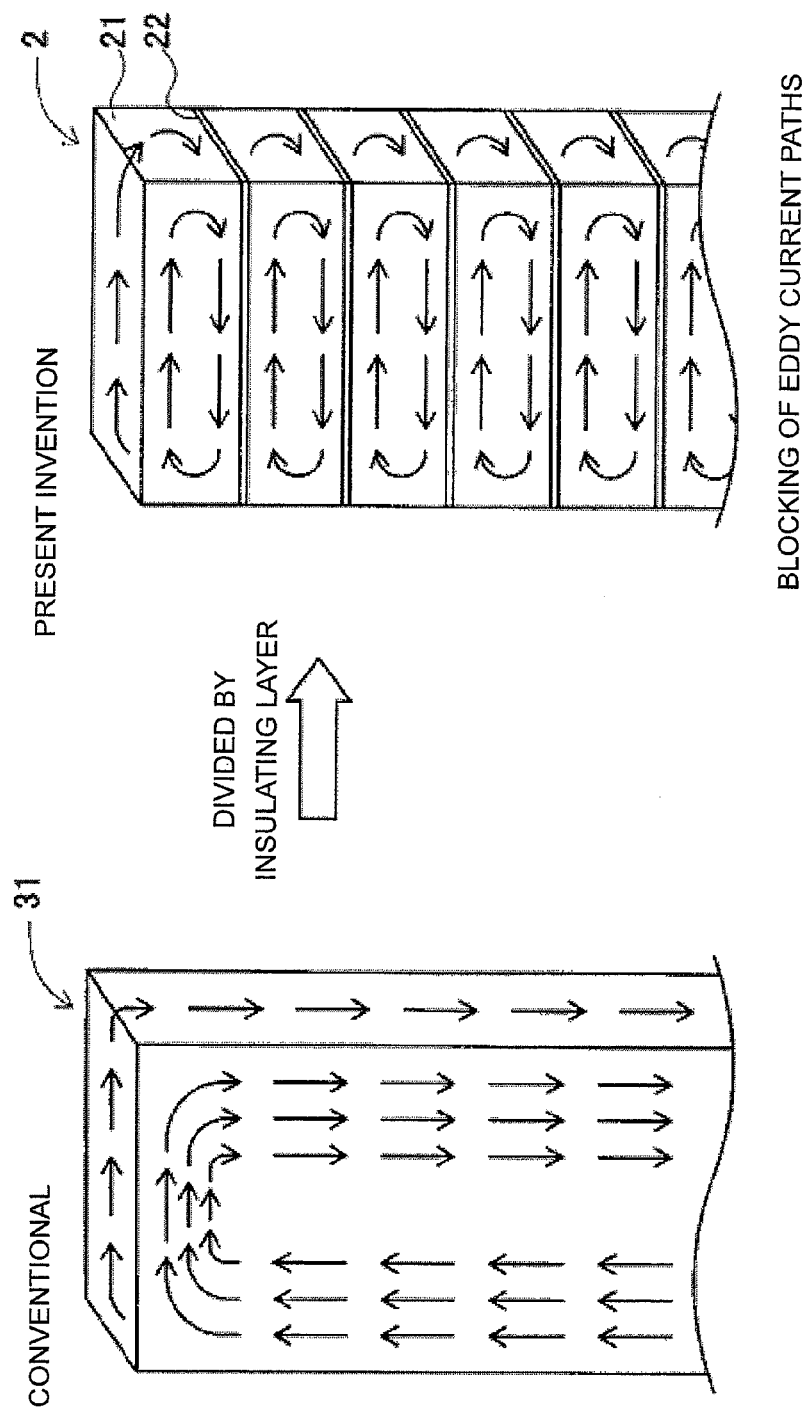
FIG. 4 is a view in which the eddy current to occur is compared between a conventional permanent magnet and a permanent magnet of the present invention.

With that, the permanent magnet 1 is formed of the plurality of sheet magnets 21 with the insulating layer sandwiched therebetween as in the above, and the eddy current to occur in the sheet magnets 21 can be reduced. FIG. 4 is a view in which the eddy current to occur is compared between a conventional permanent magnet and the permanent magnet of the present invention.

Figure 9:
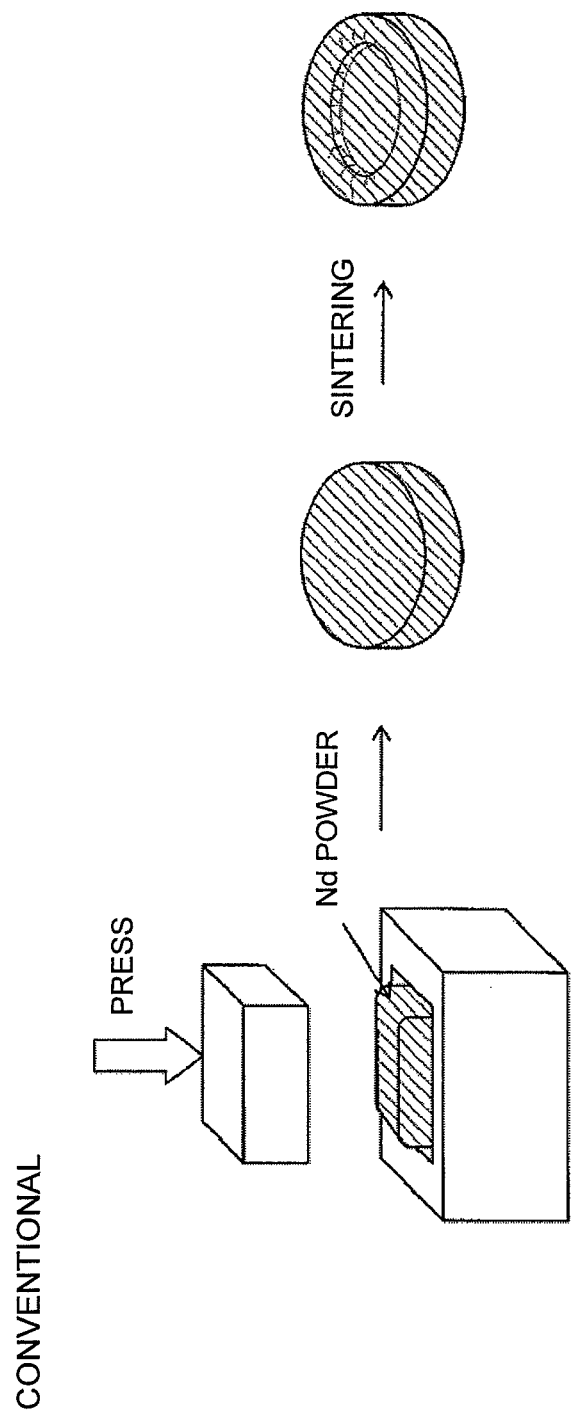
FIG. 9 is an explanatory view showing production steps of a conventional permanent magnet.

In case where an integrally-molded permanent magnet 31, which is produced by previously compression-molding a magnet powder into a rectangular parallelepiped followed by sintering it according to the conventional technique shown in FIG. 9, is used in a permanent magnet motor 2, then an eddy current occurs throughout the inside of the permanent magnet 31, as shown in FIG. 4. In this connection, recently, the demand for reducing the size and the weight of the permanent magnet motor 2 has increased; and in case where the permanent magnet motor 2 is down-sized, the shaft 16 must be rotated at a high speed in order that it can keep the same torque as that before the down-sizing. In high-speed rotation, an eddy current occurs in the permanent magnets buried in the motor, and the temperature of the permanent magnets thereby rises. With the temperature elevation, the coercive force of the permanent magnets lowers, and therefore, it is desired to prevent the occurrence of eddy current.

The permanent magnet 1 of this embodiment is formed of a plurality of sheet magnets 21 with insulating layers alternately sandwiched therebetween, as described above. Accordingly, when the permanent magnets 1 are used in the permanent magnet motor 2 and when eddy current has occurred therein, the eddy current paths could be blocked by the insulating layers, or that is, the ceramic insulating layers 22 as shown in FIG. 4. Accordingly, the level of the eddy current to occur inside the permanent magnet 1 could be reduced; and even when the permanent magnet motor 2 is rotated at a high speed, the temperature of the permanent magnets therein could be prevented from rising.

Figure 5:
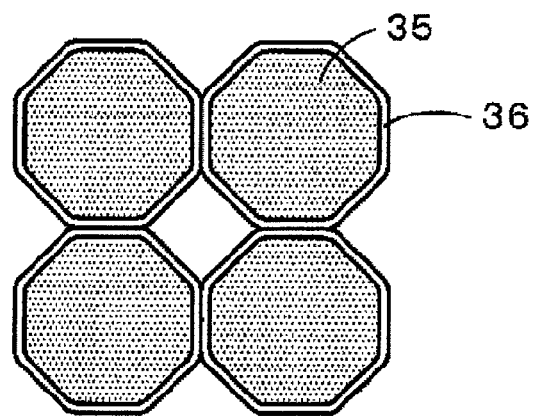
FIG. 5 is an enlarged view showing Nd magnet particles constituting a permanent magnet.

Further, the permanent magnet 1 of this embodiment is so designed that the surface of the Nd magnet particle 35 to constitute the permanent magnet 1 is coated with a Dy layer 36 to thereby enhance the coercive force of the permanent magnet 1, as shown in FIG. 5. FIG. 5 is a enlarged view of Nd magnet particles constituting the permanent magnet 1.

Figure 6:
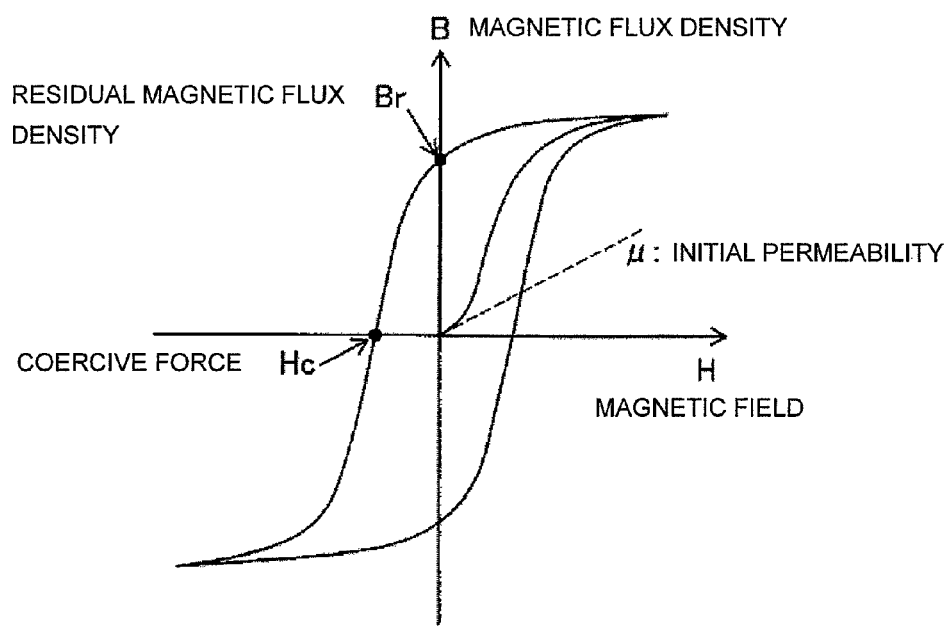
FIG. 6 is a graph showing a hysteresis curve of a ferromagnetic body.
Figure 7:
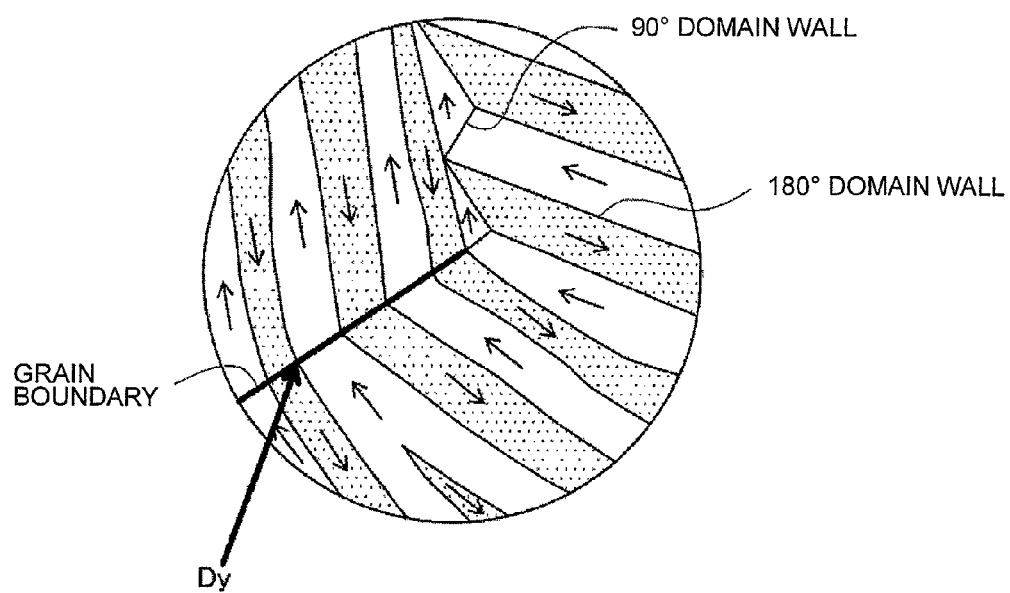
FIG. 7 is a schematic view showing a magnetic domain structure of a ferromagnetic body.

The mechanism of the Dy layer 36 to enhance the coercive force of the permanent magnet 1 is described with reference to FIG. 6 and FIG. 7. FIG. 6 is a graph showing a hysteresis curve of a ferromagnetic body; and FIG. 7 is a schematic view showing a magnetic domain structure of a ferromagnetic body.

As shown in FIG. 6, the coercive force of a permanent magnet means, when a magnetic field is applied thereto in the opposite direction from the magnetized state, the intensity of the magnetic field necessary for making the magnetic polarization zero (that is to say, for magnetization reversal). Accordingly, when the magnetization reversal can be inhibited, the magnet can secure a high coercive force. The magnetization process of a magnetic body includes rotational magnetization based on rotation of magnetic moment and domain wall displacement in which domain walls (consisting of a 90° domain wall and a 180° domain wall) as boundaries of magnetic domains move.

Here, in this embodiment, when the magnet powder is finely pulverized by wet pulverization as described later, slight amounts (for example, from 0.01 to 8 wt % based on the magnet powder (the amount of Dy added based on Nd, being taken as weight conversion of Dy distribution particularly when a Dy compound is added) of the Dy compound and a dispersing agent are added. This causes the Dy compound uniformly adhered to the particle surfaces of the Nd magnet particles 35 by wet dispersion to form the Dy layers 36 shown in FIG. 5, when the Dy compound-added magnet powder is sintered thereafter. As a result, Dy is unevenly distributed in the boundary of the magnet particle as shown in FIG. 7, thereby being able to enhance the coercive force of the permanent magnet 1.

Further, in this embodiment, when the green sheet prepared by wet-mixing the Dy compound with the magnet raw material in a solvent is sintered under proper sintering conditions, Dy can be prevented from being diffused and penetrated (solid-solutionized) into the magnet particles 35. Here, it is known that the diffusion and penetration of Dy into the magnet particles 35 decreases the residual magnetization (magnetization at the time when the intensity of the magnetic field is made zero) of the magnet. Accordingly, in this embodiment, the residual magnetization of the permanent magnet 1 can be prevented from being decreased.

The Dy layer 36 is not required to be a layer composed of only a Dy compound, and may be a layer composed of a mixture of Dy and Nd. Further, a Tb (terbium) compound may be added in place of the Dy compound, whereby it becomes possible to similarly increase the coercive force of the permanent magnet 1. In case where Tb is added, a layer of the Tb compound may be similarly formed on the surface of the Nd magnet particle 35. Forming the Tb layer may further enhance the coercive force of the permanent magnet 1.

Production Method for Permanent Magnet

Figure 8:
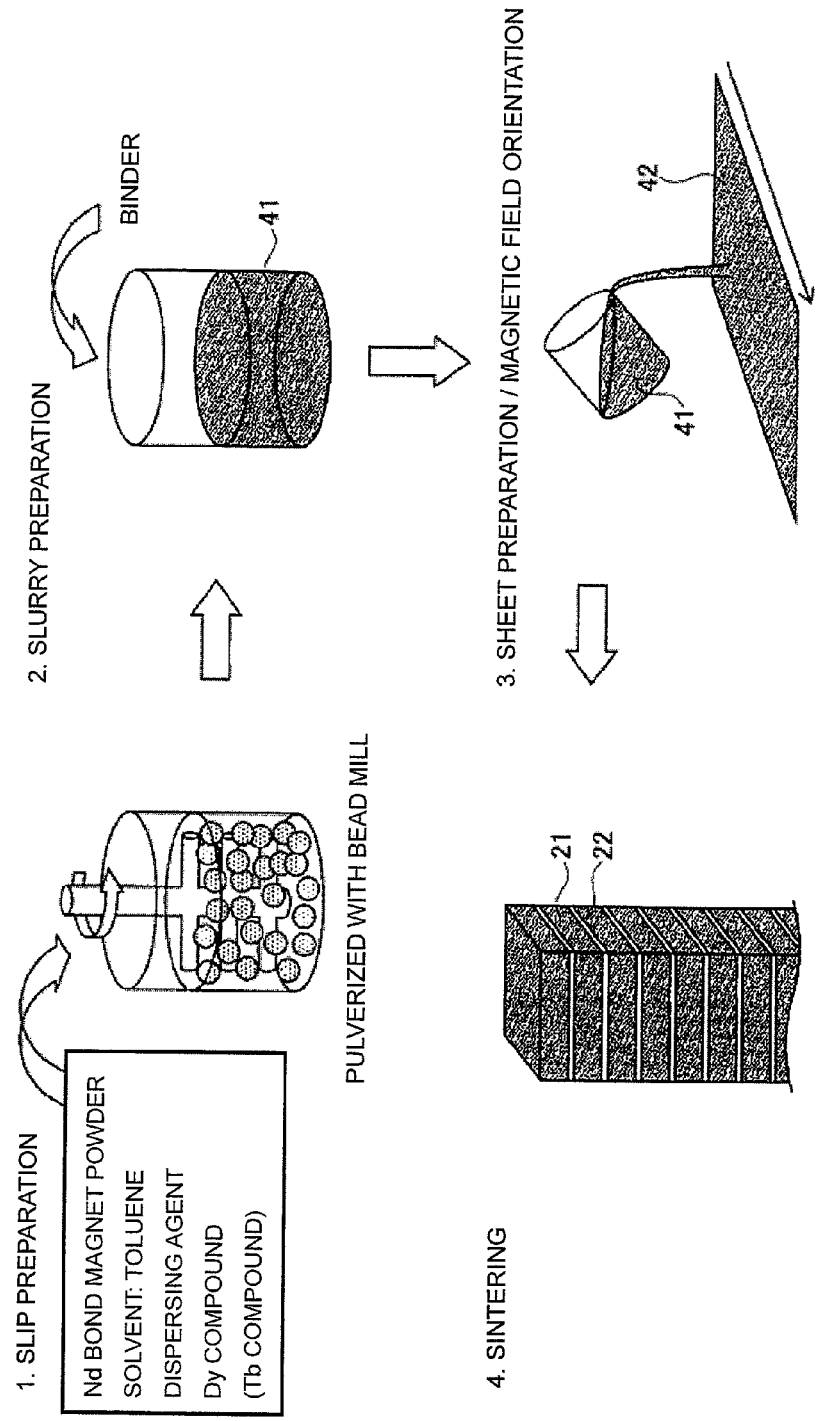
FIG. 8 is an explanatory view showing production steps of the permanent magnet according to the present embodiment.

Next described is a production method for the permanent magnet 1 of this embodiment, with reference to FIG. 8. FIG. 8 is an explanatory view showing production steps of the permanent magnet 1 of this embodiment.

First, an ingot including, in terms of % by weight, from 27 to 30% of Nd, from 60 to 70% of Fe and from 1 to 2% of B is produced. Thereafter, the ingot is crudely pulverized to a size of about 200 µm with a stamp mill, a crusher or the like. Then, the crudely pulverized magnet powder is finely pulverized to a size of about 0.3 to 5 µm by a wet method using a bead mill, and the magnet powder is dispersed in a solution to prepare a slip. In the wet pulverization, 4 kg of toluene based on 5 kg of the magnet powder is used as a solvent, and further, 0.05 kg of a phosphate-based dispersing agent is added. During the wet pulverization, from 0.01 to 8 wt % of the Dy compound is added to the magnet powder. Accordingly, the Dy compound is dispersed in the solvent together with the magnet powder. Detailed dispersing conditions are as follows:

Dispersing Device: bead mill
Dispersing Medium: zirconia beads

Here, a substance soluble in the solvent of the slurry is preferably used as the Dy compound to be added. For example, a Dy-containing organic material, more particularly a dysprosium cation-containing organic acid salt (an aliphatic carboxylate, an aromatic carboxylate, an alicyclic carboxylate, an alkyl-aromatic carboxylate or the like), a dysprosium cation-containing organic complex (an acetylacetonate, a phthalocyan complex, a merocyan complex or the like) and an organic metal compound other than the above may be mentioned.

Further, it also becomes possible to uniformly adhere Dy or a Dy compound to the surface of a Nd magnet particle by adding thereto Dy or a Dy compound pulverized into fine particles at the time of wet dispersion, and uniformly dispersing the fine particles, even when it is insoluble in the solvent.

There is no particular limitation on the solvent to be used in pulverization, and there can be used an alcohol such as isopropyl alcohol, ethanol or methanol, a lower hydrocarbon such as pentane or hexane, an aromatic compound such as benzene, toluene or xylene, a ketone, a mixture thereof or the like. In particular, isopropyl alcohol or the like is preferred.

After dispersion of the magnet powder, a resin binder is added to and mixed with the slip prepared. Subsequently, the magnet powder and the resin binder are kneaded to produce a slurry 41. The material to be used as the resin binder is not particularly limited, and may be any of various thermoplastic resin single substances or mixtures thereof, or various thermosetting resin single substances or mixtures thereof. Their physical properties and other natures are not also specifically defined, and any ones capable of providing desired properties are employable here. For example, methacrylic resins may be mentioned.

Subsequently, a green sheet 42 is formed from the slurry 41 produced. Regarding the method for forming the green sheet 42, for example, there may be mentioned a method of coating a supporting substrate such as a separator as needed with the produced slurry 41 by an appropriate system, followed by drying. The coating system is preferably a system excellent in layer thickness controllability, such as a doctor blade method. Also preferably, a defoaming agent is used for sufficient defoaming treatment so as not to make air bubbles remain in the developed layer. Detailed coating conditions are as follows:

Coating system: doctor blade
Gap: 1 mm
Supporting substrate: silicone-processed polyester film
Drying conditions: 130° C.×30 min after 90° C.×10 min A pulsed field is applied to the green sheet 42 formed on the supporting substrate, in a direction crossing to a transfer direction. Accordingly, the magnetic field is oriented in the desired direction. It is necessary to determine the direction in which the magnetic filed is oriented, taking into consideration the magnetic field direction required for the permanent magnet 1 molded from the green sheet 42.

Next, the green sheet 42 formed from the slurry 41 is divided into tabular plates each having a size of 10 mm×5 mm×2 mm. Then, between the thus-devided green sheets, a ceramic green sheet separately formed from a ceramic powder is arranged, and thus, a plurality of green sheets of magnet powder and a plurality of ceramic green sheets are alternately laminated (see FIG. 3), and sintered at 1100° C. for about 1 hour. The sintering is in Ar or in a vacuum. As a result of the sintering, the permanent magnet 1 that includes the laminated plural sheet magnets 21 is produced.

In case where an epoxy resin is used as the insulating layer in place of the ceramic insulating layer, first the green sheet formed of the slurry is sintered to prepare the sheet magnet 21. Subsequently, an epoxy resin is applied between the sheet magnets 21 to bond the sheet magnets 21 to each other, thereby obtaining a permanent magnet 1 that includes the sheet magnets 21 and insulating layers alternately laminated to each other.

As described in the above, for the permanent magnet 1 and according to the production method for the permanent magnet 1 of this embodiment, a magnet material including, in terms of % by weight, from 27 to 30% of Nd, from 60 to 70% of Fe and from 1 to 2% of B is wet-pulverized in a solvent, then a resin binder is added to the pulverized magnet powder, the magnet powder and the resin binder are kneaded to produce a slurry 41, and the produced slurry is molded into a sheet to obtain a green sheet 42, and the green sheets 42 and ceramic insulating layers 22 to be the insulating layers are alternately laminated (see FIG. 3) and sintered to produce the permanent magnet 1. Accordingly, even when the permanent magnet motor 2 with the permanent magnets 1 buried therein is rotated at a high speed, the eddy current to occur inside the permanent magnets 1 can be reduced. Therefore, a high-power small-sized motor can be provided, which is free from temperature elevation and coercive force depression of the permanent magnets 1 therein.

In particular, for an Nd-based magnet capable of especially securing a high coercive force, even when the permanent magnet motor is rotated at a high speed, the eddy current to occur inside the magnet can be reduced.

Further, the ceramic green sheets to be the insulating layers are sintered together in sintering the green sheets 42 of magnet powder, whereby the permanent magnet 1 in which a plurality of sheet magnets 21 are laminated is formed. Therefore, after sintered, it is not necessary to bond the sheet magnets 21 with the insulating layers therebetween, and therefore, the permanent magnet 1 in which a plurality of sheet magnets 21 are laminated can be produced in a simplified steps.

Further, the respective sheet magnets are, after molded, bonded with the resin to be the insulating layer to produce the permanent magnet 1. Therefore, permanent magnets produced under conventional sintering conditions may be bonded with a resin to obtain a simple-structured permanent magnet in which the eddy current to occur inside the magnets may be reduced.

The permanent magnet 1 is produced by sintering the green sheets 42. Therefore, the contraction due to sintering becomes uniform, whereby the deformations such as warpage and depressions do not occur after sintering. Additionally, it is unnecessary to perform the conventional correcting processing after sintering, which can simplify the production steps, because the pressure unevenness at the time of pressing disappears. Therefore, it becomes possible to mold the permanent magnet 1 with a high degree of dimension accuracy.

Incidentally, the invention should not be construed as being limited to the above-mentioned example, and various improvements and modifications are of course possible within the range not departing from the gist of the invention.

For example, in this embodiment, as the method of dispersing the magnet powder and the Dy compound in a solvent, both the crudely-pulverized magnet powder and the Dy compound are wet-pulverized and dispersed in a solvent, as shown in FIG. 8; however, they may be dispersed according to the following method.

(1) First, a crudely pulverized magnet powder is finely pulverized to a size of about 0.3 to 5 μm by dry-pulverization using a ball mill, a jet mill or the like.

(2) Then, the finely-pulverized magnet powder is added to a solvent and uniformly dispersed in the solvent. In this step, a dispersing agent and a Dy compound are added to the solvent.

(3) The magnet powder and the resin binder dispersed in the solvent are kneaded to produce a slurry 41.

After this, the slurry is processed in the same manner as in this embodiment, thereby producing a permanent magnet having the same constitution as in this embodiment.

In this embodiment, an ingot of Nd—Fe—B is first pulverized and thereafter a Dy compound is added thereto and dispersed in a solvent to produce a green sheet. Apart from this, however, an ingot of Nd—Fe—Dy—B that previously contains Dy may be pulverized and dispersed in a solvent to produce a green sheet. In such a case, the amount of Dy to be contained in the ingot must be from 20 to 30 wt % based on Nd.

In this embodiment, a permanent magnet to be buried in a permanent magnet motor 2 to be mounted on a hybrid vehicle is described as an example; however, naturally, the invention is of course applicable to the permanent magnet to be buried in a permanent magnet motor such as a vibration motor to be mounted on a cellular phone, a voice coil motor to drive the head of a hard disk drive, a spindle motor to rotate the disk of a hard disk drive, etc.

The pulverizing conditions, the kneading conditions and the sintering conditions for the magnet powder are not limited to those described in the above-mentioned examples.

While the invention has been described in detail and with reference to specific embodiments thereof, it will be apparent to one skilled in the art that various changes and modifications can be made therein without departing from the spirit and scope thereof.

This application is based on a Japanese patent application No. 2008-069403 filed Mar. 18, 2008, the entire contents thereof being hereby incorporated by reference.

All the references cited herein are incorporated herein as a whole.

INDUSTRIAL APPLICABILITY

According to the invention, the permanent magnet for a motor is constituted by laminating a plurality of sheet magnets with insulating layers arranged between them. Therefore, when a permanent magnet motor with the permanent magnets buried therein is rotated at a high speed, the eddy current to occur inside the permanent magnets may be reduced. Accordingly, the permanent magnets are free from the problems of temperature elevation and coercive force depression, therefore making it possible to provide a high-power small-sized motor. Since the invention has the above-mentioned constitution, the contraction thereof due to sintering is reduced, whereby the deformations such as warpage and depressions hardly occur after sintering. Further, it is unnecessary to perform the conventional correcting processing after sintering, which can simplify the production steps, because the pressure unevenness at the time of pressing disappears. Therefore, it becomes possible to mold the permanent magnet with a high degree of dimension accuracy.

The invention claimed is:

1. A method for producing a permanent magnet for a motor, to be buried in a permanent magnet motor, comprising:
   a step of pulverizing a magnet raw material in an organic solvent,
   a step of mixing the magnet raw material and a resin binder in the organic solvent to produce a magnet powder,
   a step of molding the slurry into a sheet form to prepare green sheets of the magnet powder,
   a step of applying a magnetic field to the green sheets thereby orienting the magnetic field, and
   a step of alternately laminating the green sheets of the magnet powder and an insulating layer and sintering the laminated plural layers,
   wherein the permanent magnet is a Nd-based magnet.

2. A method for producing a permanent magnet for a motor, to be buried in a permanent magnet motor, comprising:

a step of pulverizing a magnet raw material in an organic solvent, a step of mixing the magnet raw material and a resin binder in the organic solvent to produce a slurry of a magnet powder, a step of molding the slurry into a sheet form to prepare a green sheet of the magnet powder, a step of applying a magnetic field to the green sheets thereby orienting the magnetic field, a step of sintering the green sheet of the magnet powder to produce sheet magnets, and a step of alternately laminating a plurality of the sheet magnets and an insulating layer, wherein the permanent magnet is a Nd-based magnet.

3. The method for producing a permanent magnet for a motor according to claim 1, wherein the insulating layer is formed of a ceramic green sheet.

4. The method for producing a permanent magnet for a motor according to claim 1 or 2, wherein the magnet powder comprises an Nd-based magnet powder.

5. The method for producing a permanent magnet for a motor according to claim 2, wherein the insulating layer is formed of a resin to bond the sheet magnets.

* * * * *